(12) United States Patent
Wang et al.

(10) Patent No.: US 10,565,955 B2
(45) Date of Patent: Feb. 18, 2020

(54) DISPLAY STATUS ADJUSTMENT METHOD, DISPLAY STATUS ADJUSTMENT DEVICE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Di Wang, Beijing (CN); Hao Zhang, Beijing (CN); Lingyun Shi, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 260 days.

(21) Appl. No.: 15/107,384

(22) PCT Filed: Jan. 22, 2016

(86) PCT No.: PCT/CN2016/071713
§ 371 (c)(1),
(2) Date: Jun. 22, 2016

(87) PCT Pub. No.: WO2017/012321
PCT Pub. Date: Jan. 26, 2017

(65) Prior Publication Data
US 2018/0197499 A1  Jul. 12, 2018

(30) Foreign Application Priority Data
Jul. 17, 2015  (CN) .......................... 2015 1 0425488

(51) Int. Cl.
*G09G 5/00* (2006.01)
*G06F 3/147* (2006.01)
(Continued)

(52) U.S. Cl.
CPC ............. *G09G 5/003* (2013.01); *G06F 3/147* (2013.01); *G06N 3/0481* (2013.01); *G06N 3/08* (2013.01);
(Continued)

(58) Field of Classification Search
CPC ............ G09G 5/003; G06N 3/02; G06N 3/04; G06N 3/08; G06N 2320/08
See application file for complete search history.

(56) References Cited

U.S. PATENT DOCUMENTS 5,760,760 A     6/1998  Helms
6,550,320 B1 *  4/2003  Giustino ............... B60T 8/1725
                                                73/146

(Continued)

FOREIGN PATENT DOCUMENTS

CN    101404150 A    4/2009
CN    101521973 A    9/2009
(Continued)

OTHER PUBLICATIONS

Adeli, Hojjat, and Xiaomo Jiang. "Dynamic fuzzy wavelet neural network model for structural system identification." Journal of Structural Engineering 132.1 (2006): 102-111.*
(Continued)

*Primary Examiner* — Ryan McCulley
(74) *Attorney, Agent, or Firm* — Nath, Goldberg & Meyer; Joshua B. Goldberg (57) ABSTRACT

The present invention provides a display status adjustment method, a display status adjustment device and a display device, which belongs to the field of display technology and can solve the problem that the existing display status adjustment method for a display is too simple and has low accuracy. The display status adjustment method of the present invention comprises steps of: collecting information
(Continued)

parameter of an environment where a display is located; inputting the collected information parameter to a pre-built wavelet neural network model for analysis, and obtaining a display status in which the display is to display; and adjusting display status of the display based on analysis result.

18 Claims, 3 Drawing Sheets

(51) Int. Cl.
  *G06N 3/04* (2006.01)
  *G06N 3/08* (2006.01)
(52) U.S. Cl.
  CPC ....... *G09G 5/00* (2013.01); *G09G 2320/0626* (2013.01); *G09G 2320/08* (2013.01); *G09G 2340/04* (2013.01); *G09G 2340/0407* (2013.01); *G09G 2360/144* (2013.01); *G09G 2360/16* (2013.01)

(56) References Cited

U.S. PATENT DOCUMENTS

| | | | | |
|---|---|---|---|---|
| 2006/0101293 | A1* | 5/2006 | Chandley | G06F 1/3203 713/300 |
| 2012/0158631 | A1* | 6/2012 | Pitcher | G06F 17/5009 706/21 |
| 2012/0320014 | A1 | 12/2012 | Longhurst et al. | |
| 2013/0124847 | A1 | 5/2013 | Fried et al. | |
| 2014/0362617 | A1* | 12/2014 | Li | H02J 3/00 363/34 |
| 2014/0368483 | A1 | 12/2014 | Zhang et al. | |
| 2015/0191138 | A1* | 7/2015 | Quintero | B60R 16/0231 701/33.9 |
| 2015/0313529 | A1 | 11/2015 | Nevo et al. | |
| 2017/0264851 | A1* | 9/2017 | Kuplevakhsky | G09G 3/20 |

FOREIGN PATENT DOCUMENTS

| | | |
|---|---|---|
| CN | 201409246 Y | 2/2010 |
| CN | 102122133 A | 7/2011 |
| CN | 102663976 A | 9/2012 |
| CN | 103707769 A | 4/2014 |
| CN | 104036474 A | 9/2014 |
| CN | 104094287 A | 10/2014 |
| CN | 104320881 A | 1/2015 |
| CN | 104596957 A | 5/2015 |
| CN | 104978947 A | 10/2015 |

OTHER PUBLICATIONS

Aminian, Mehran, and Farzan Aminian. "Neural-network based analog-circuit fault diagnosis using wavelet transform as preprocessor." IEEE Transactions on Circuits and Systems II: Analog and Digital Signal Processing 47.2 (2000): 151-156.*
Gaing, Zwe-Lee. "Wavelet-based neural network for power disturbance recognition and classification." IEEE transactions on power delivery 19.4 (2004): 1560-1568.*
Szu, Harold H., Brian A. Telfer, and Shubha L. Kadambe. "Neural network adaptive wavelets for signal representation and classification." Optical Engineering 31.9 (1992): 1907-1917.*
Veitch, David. "Wavelet Neural Networks and their application in the study of dynamical systems." Department of Mathematics university of York UK (2005).*
Wang, Gaige, Lihong Guo, and Hong Duan. "Wavelet neural network using multiple wavelet functions in target threat assessment." The Scientific World Journal 2013 (2013).*
Zhang, Jun, et al. "Wavelet neural networks for function learning." IEEE transactions on Signal Processing 43.6 (1995): 1485-1497.*
Second office action dated Sep. 4, 2017 for corresponding CN application 201510425488.7 with English translation.
First Office Action dated Feb. 4, 2017 corresponding to Chinese application No. 201510425488.7.
Li Xinwu, "Monitor Color Management Model Based on Wavelet Neural Network", Journal of Data Acquisition & Porcessing, Jul 2008, vol. 23, No. 4.
Form PCT/ISA/210 issued in corresponding international application No. PCT/CN2016/071713 dated Apr. 21, 2016.
Form PCT/ISA/220 issued in corresponding international application No. PCT/CN2016/071713 dated Apr. 21, 2016.
Form PCT/ISA/237 issued in corresponding international application No. PCT/CN2016/071713 dated Apr. 21, 2016.

* cited by examiner

DISPLAY STATUS ADJUSTMENT METHOD, DISPLAY STATUS ADJUSTMENT DEVICE AND DISPLAY DEVICE

This is a National Phase Application filed under 35 U.S.C. 371 as a national stage of PCT/CN2016/071713, filed Jan. 22, 2016, an application claiming the benefit of Chinese Application No. 201510425488.7, filed Jul. 17, 2015, the content of each of which is hereby incorporated by reference in its entirety.

FIELD OF THE INVENTION

The present invention relates to the field of display technology, and particularly to a display status adjustment method, a display status adjustment device and a display device.

BACKGROUND OF THE INVENTION

A display device presents its screen output, appearance design and performance to end users. Appropriate brightness and resolution can improve user's experience.

The user has different needs for display status of a screen in different scenarios. For example, under a condition of bright environment, the brightness of the screen of the display device has to be increased, so as to fulfill watching need, while under a condition of dark environment, the brightness of the screen of the display device has to be decreased, so as to keep a suitable brightness and prevent eyes from being harmed.

Taking a mobile phone as an example, at present, display status adjustment methods for a mobile phone screen generally includes: (1) detecting brightness of ambient light through a light sensor built in the mobile phone, and automatically adjusting the brightness of the mobile phone screen based on the detected brightness of ambient light; and (2) manually adjusting brightness, resolution, refresh rate and the like of the mobile phone screen by a personalization setting function in the operating system of the mobile phone, for example, the brightness, resolution, refresh rate and the like of a screen may be adjusted by adjusting corresponding parameters in a setting menu.

The inventors have found that there exist at least the following problems in the prior art. When the mobile phone screen is adjusted by the method (1), only the brightness of the mobile phone screen can be adjusted, therefore the function is simple. On the other hand, there are more parameters can be set when the mobile phone screen is adjusted by the method (2), but the parameters have to be manually set, thereby consuming energy and having low accuracy.

SUMMARY OF THE INVENTION

In view of the above shortcomings existing in the conventional adjustment methods for the display screen, embodiments of the present invention provide a display status adjustment method, a display status adjustment device and a display device, which can adjust the display status in an intelligent and convenient manner and have high accuracy and well applicability.

According to an embodiment of the present invention, there is provided a display status adjustment method, comprising steps of: collecting information parameter of an environment where a display is located; inputting the collected information parameter to a pre-built wavelet neural network model for analysis, and obtaining a display status in which the display is to display; and adjusting display status of the display based on analysis result.

Preferably, the information parameter comprises at least one of gravitational acceleration parameter, light parameter, position parameter, temperature parameter and angle parameter.

Preferably, adjustment target of the display status includes at least one of brightness, standby, resolution and refresh rate.

Preferably, the wavelet neural network model is updated every time when the information parameter of the environment where the display is located is collected 100 times.

Preferably, the wavelet neural network model is generated from wavelet basis function.

Preferably, the wavelet neural network model comprises an input layer, a hidden layer and an output layer, wherein the information parameter input to the input layer is $X_i$, where i=1, 2, 3 ... k, k is a positive integer, and an output of the hidden layer is $h_n(j)$.

$$h_n(j) = h_j \left[ \frac{\sum_{i=1}^{k} \omega_{ij} - b_j}{a_j} \right],$$

where i is an i-th node of the input layer, j is a j-th node of the hidden layer; $\omega_{ij}$ is a connection weight between the i-th node of the input layer and the j-th node of the hidden layer; $h_j$ is the wavelet basis function; $b_j$ is a shift factor of the wavelet basis function $h_j$; $a_j$ is a scale factor of the wavelet basis function $h_j$; and n is a positive integer.

Further preferably, a value of the output layer is $y_n(k)$, $$y_n(k) = \sum_{i=1}^{k} \omega_{jk} h_{n-1}(j),$$

where $\omega_{jk}$ is a connection weight between the j-th node of the hidden layer and a k-th node of the output layer.

Preferably, before collecting information parameter of an environment where a display is located, the method further comprises steps of: building the wavelet neural network model; training the built wavelet neural network model; and testing the wavelet neural network model.

Preferably, the wavelet neural network model is generated from wavelet basis function, wherein the step of training the built wavelet neural network model comprises: a step of initializing the wavelet neural network model, wherein the scale factor and the shift factor of the wavelet basis function and the connection weights of wavelet neural network are initialized randomly, and learning speed of the wavelet neural network model is set; a step of classifying samples for classifying samples into a training sample and a testing sample, wherein the training sample is used for training the wavelet neural network model and the testing sample is used for testing the test accuracy of the wavelet neural network model; a step of calculating and analyzing for inputting the training sample into the wavelet neural network model, calculating a predict output value of the wavelet neural network model, calculating an error between the predict output value and a desired output value of the wavelet neural network model, and analyzing to obtain training times, wherein if the error is less than or equal to 0.0001, or the training times obtained by analysis reaches a predetermined value, a step of outputting the predict output value is performed, otherwise, a step of correction is performed, the step of correction is used for correcting the scale factor and the shift factor of the wavelet basis function and the connection weights of the wavelet neural network, such that the error between the predict output value and the desired output value of the wavelet neural network model is less than or equal to 0.0001; and the step of outputting the predict output value for outputting the predict output value.

According to another embodiment of the present invention, there is provided a display status adjustment device, comprising a collecting unit for collecting information parameter of an environment where a display is located; an analysis unit for inputting the collected information parameter to a pre-built wavelet neural network model for analysis and obtaining a display status in which the display is to display; and an adjustment unit for adjusting display status of the display based on analysis result.

Preferably, the collecting unit comprises at least one of a gravity accelerometer, a light sensor, a temperature sensor, a positioning module and an electronic compass.

Preferably, adjustment target of the display status includes at least one of brightness, standby, resolution and refresh rate.

Preferably, the display status adjustment device further comprises a modeling unit for building the wavelet neural network model, a training unit for training the built wavelet neural network model, and a testing unit for testing the wavelet neural network model.

Further preferably, the training unit comprises an initialization module for randomly initializing a scale factor and a shift factor of wavelet basis function and connection weights of wavelet neural network, and setting learning speed of the wavelet neural network model; a sample classification module for classifying samples into a training sample and a testing sample, wherein the training sample is used for training the wavelet neural network model and the testing sample is used for testing the test accuracy of the wavelet neural network model; a calculation and analysis module for inputting the training sample into the wavelet neural network model, calculating a predict output value of the wavelet neural network model, calculating an error between the predict output value and a desired output value of the wavelet neural network model, and analyzing to obtain training times, wherein if the error is less than or equal to 0.0001, or the training times obtained by analysis reaches a predetermined value, the predict output value is output; and a correction module for correcting, if the error is larger than 0.0001 and the training times obtained by analysis does not reach the predetermined value, the scale factor and the shift factor of the wavelet basis function and the connection weights of the wavelet neural network, such that the error between the predict output value and the desired output value of the wavelet neural network model is less than or equal to 0.0001.

Preferably, the analysis unit is also used for analyzing collection times of the collecting unit and updating the wavelet neural network model every time when the information parameter of the environment where the display is located is collected 100 times.

Preferably, the wavelet neural network model is generated from wavelet basis function.

Further preferably, the wavelet neural network model comprises an input layer, a hidden layer and an output layer, wherein the information parameter input to the input layer is $X_i$, where i=1, 2, 3 ... k, k is a positive integer, and an output of the hidden layer is $h_n(j)$, $$h_n(j) = h_j\left[\frac{\sum_{i=1}^{k}\omega_{ij} - b_j}{a_j}\right],$$

where i is an i-th node of the input layer, j is a j-th node of the hidden layer; $\omega_{ij}$ is a connection weight between the i-th node of the input layer and the j-th node of the hidden layer; $h_j$ is the wavelet basis function; $b_j$ is a shift factor of the wavelet basis function $h_j$; $a_j$ is a scale factor of the wavelet basis function $h_j$; and n is a positive integer.

Further preferably, a value of the output layer is $y_n(k)$, $$y_n(k) = \sum_{i=1}^{k}\omega_{jk}h_{n-1}(j),$$

where $\omega_{jk}$ is a connection weight between the j-th node of the hidden layer and a k-th node of the output layer.

According to still another embodiment of the present invention, there is provided a display, comprising the above display status adjustment device.

With the display status adjustment method provided by the embodiment of the present invention, the collected information parameter of an environment where a display (or user) is located is analyzed with the wavelet neural network, so as to obtain information about the environment where the display is located, which corresponds to a display status of the display, therefore, display status of the display can be adjusted according to the information. The adjustment method is very intelligent and has high applicability.

With the display status adjustment device provided by the embodiment of the present invention, the information parameters of an environment where a display is located, which are detected by the gravity accelerometer, the light sensor, the temperature sensor, the positioning module and the electronic compass, are merged together and analyzed with the wavelet neural network, so that display status of the display is adjusted based on analysis result. Compared with conventional single function sensors such as a light sensor, higher recognition accuracy and wider applicable range are obtained.

The display provided by the embodiment of the present invention comprises the above display status adjustment device, and obtains higher recognition accuracy and wider applicable range compared with the case in which such configuration is not provided.

DETAILED DESCRIPTION OF THE EMBODIMENTS

To make those skilled in the art better understand the technical solutions of the present invention, the present invention will be described below in detail in conjunction with the accompanying drawings and specific embodiments.

First Embodiment

Figure 1:
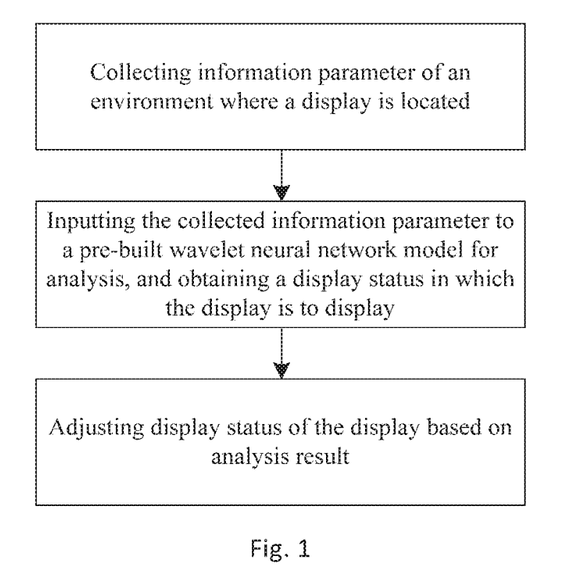
FIG. 1 is a flow chart illustrating a display status adjustment method according to a first embodiment of the present invention.

The present embodiment provides a display status adjustment method for adjusting display status of a display (for example, a mobile phone's display screen) such as brightness, resolution, refresh rate and the like. FIG. 1 is a flow chart illustrating the display status adjustment method according to the present embodiment. As shown in FIG. 1, the adjustment method comprises steps of: collecting information parameter of an environment where a display is located; inputting the collected information parameter to a pre-built wavelet neural network model for analysis, and obtaining a display status in which the display is to display; and adjusting display status of the display based on the obtained analysis result.

In the present embodiment, the collected information parameter of an environment where a display (or user) is located is analyzed by means of the wavelet neural network, so as to obtain information about the environment where the display is located, which corresponds to a display status of the display, therefore, display status of the display can be adjusted according to the information. The adjustment method is very intelligent and has high applicability. The specific implementations of the method will be described below in detail in conjunction with the following embodiments.

Second Embodiment

The present embodiment provides a display status adjustment method, which will be described below in detail in conjunction with FIGS. 1-4. The method specifically comprises the following steps S1 to S4.

At step S1, an intelligent algorithm is modeled.

Figure 2:
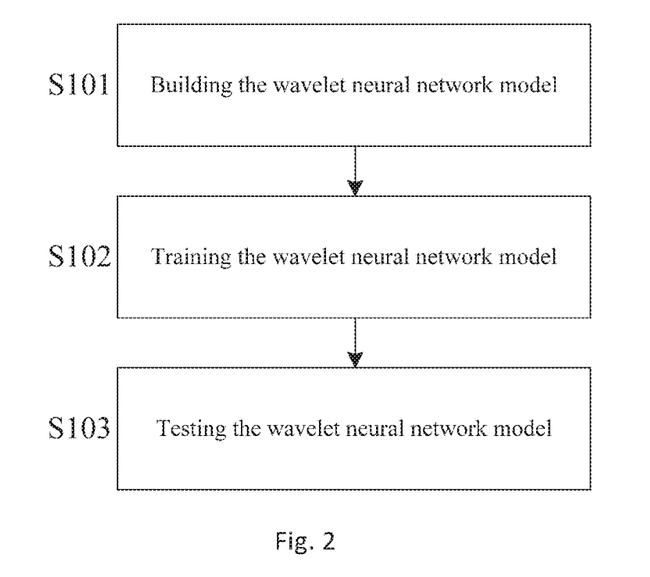
FIG. 2 is a flow chart illustrating a process of modeling an intelligent algorithm in a display status adjustment method according to a second embodiment of the present invention.

FIG. 2 is a flow chart illustrating a process of modeling the intelligent algorithm. As shown in FIG. 2, the process of modeling the intelligent algorithm specifically comprises the following steps S101 to S103.

At step S101, a wavelet neural network model is built, wherein the wavelet neural network model is generated from wavelet basis function. The mathematical formula of the wavelet basis function is:

$$h_j = \frac{2}{\sqrt{3}} \pi^{-\frac{1}{4}} (1 - x^2) e^{-\frac{x^2}{2}}.$$

Figure 3:
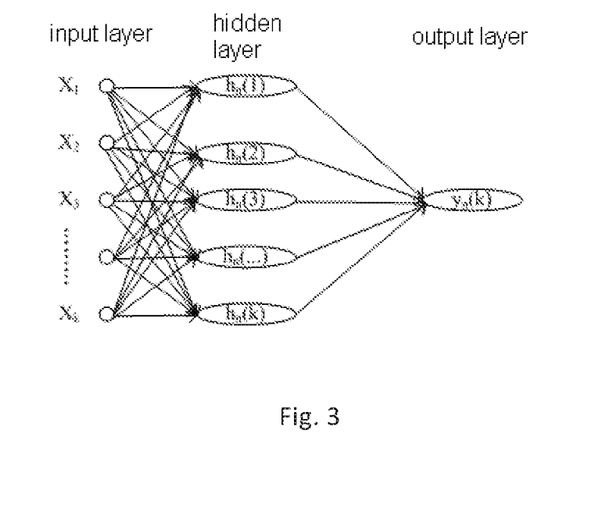
FIG. 3 is a schematic diagram illustrating a wavelet neural network model according to the second embodiment of the present invention.

FIG. 3 is a schematic diagram illustrating the wavelet neural network model according to the present embodiment. As shown in FIG. 3, the wavelet neural network model comprises an input layer, a hidden layer and an output layer. When information parameter input to the input layer is Xi (i=1, 2, 3 . . . k; k is a positive integer), an output of the hidden layer is $h_n(j)$, $$h_n(j) = h_j \left[ \frac{\sum_{i=1}^{k} \omega_{ij} - b_j}{a_j} \right];$$

where i is an i-th node of the input layer, j is a j-th node of the hidden layer; $\omega_{ij}$ is a connection weight between the i-th node of the input layer and the j-th node of the hidden layer; $h_j$ is the wavelet basis function; $b_j$ is a shift factor of the wavelet basis function $h_j$; $a_j$ is a scale factor of the wavelet basis function $h_j$; and n is a positive integer.

A value of the output layer is $y_n(k)$, $$y_n(k) = \sum_{i=1}^{k} \omega_{jk} h_{n-1}(j);$$

where $\omega_{jk}$, is a connection weight between the j-th node of the hidden layer and a k-th node of the output layer. It should be noted that the wavelet neural network model may be updated every time when the information parameter of the environment where the display is located is collected several times, wherein $h_n(j)$ represents the output of the j-th node of the hidden layer after updating the wavelet neural network model n times, and $h_{n-1}(j)$ represents the output of the j-th node of the hidden layer after updating the wavelet neural network model (n−1) times.

Next, returning to FIG. 2, at step S102, the wavelet neural network model is trained after the wavelet neural network model has been built.

Figure 4:
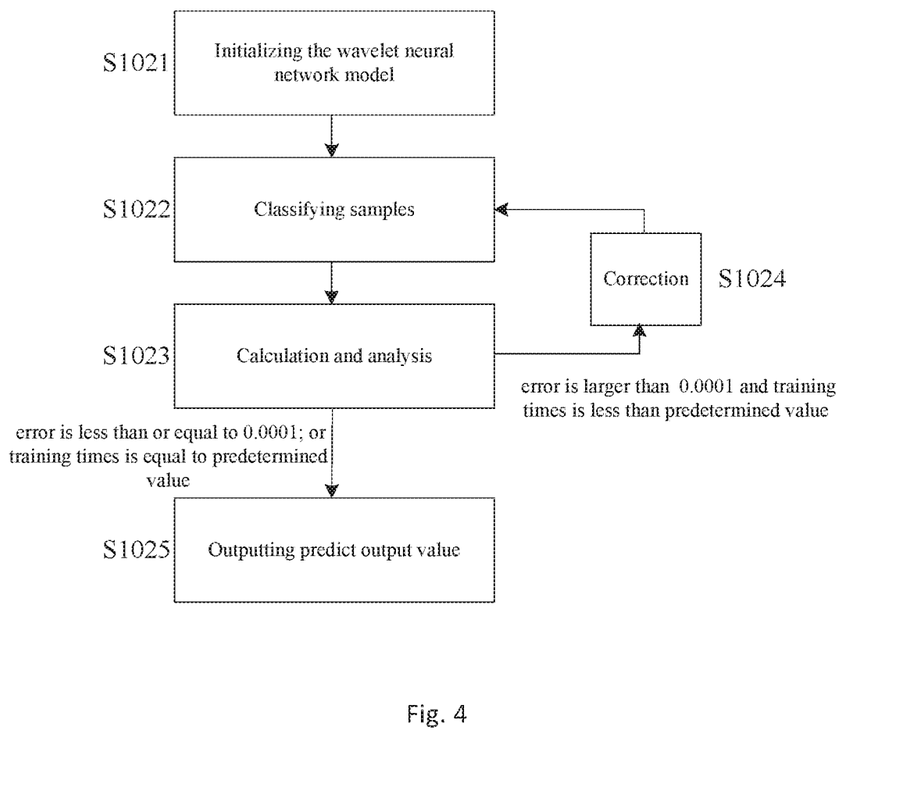
FIG. 4 is a flow chart illustrating a process of training the wavelet neural network model in the display status adjustment method according to the second embodiment of the present invention.

FIG. 4 is a flow chart illustrating a process of training the wavelet neural network model according to the present embodiment. As shown in FIG. 4, the process of training the wavelet neural network model specifically comprises the following steps S1021 to S1025.

At step S1021, the wavelet neural network model is initialized. Specifically, the scale factor and the shift factor of the wavelet basis function and the connection weights of the wavelet neural network are initialized randomly, and learning speed of the wavelet neural network model is set; the learning speed is usually 0.1.

At step S1022, samples are classified. Specifically, the samples are classified into a training sample and a testing sample, wherein the training sample is used for training the wavelet neural network model, and the testing sample is used for testing the test accuracy of the wavelet neural network model.

At step S1023, a calculation and an analysis are performed. Specifically, the training sample is input to the wavelet neural network model, a predict output value of the wavelet neural network model is calculated and an error between the predict output value and a desired output value is calculated, and the analysis is performed to obtain training times. If the error is less than or equal to 0.0001, or the training times obtained by the analysis reaches a predetermined value, a step S1025 of outputting the predict output value is performed, otherwise, a step S1024 is performed.

At step 1024, the factors and weights are corrected. Specifically, the scale factor and the shift factor of the wavelet basis function and the connection weights of the wavelet neural network are corrected, such that the error between the predict output value and the desired output value of the wavelet neural network model is less than or equal to 0.0001.

At step S1025, the predict output value is output. To this end, the training of the wavelet neural network model is completed.

Next, returning to FIG. 2, after the training of the wavelet network model is completed, at step S103, the wavelet neural network model is tested.

At this step, the wavelet neural network model obtained by training in step S102 is applied to the display status adjustment for a display. The wavelet neural network model is tested by using the collected information parameter of the environment, so as to obtain a desired wavelet neural network model. To this end, the process of modeling the intelligent algorithm (that is, wavelet neural network) is completed.

Incidentally, in the present embodiment, the wavelet neural network model may be updated, for example, every time when the information parameter of the environment where the display is located is collected 100 times, so as to improve the analysis accuracy on the environment.

Next, after the intelligent algorithm has been modeled, at step S2, the information parameter of the environment where the display is located is collected.

At this step, specifically, the collected information parameter may comprise at least one of gravitational acceleration parameter, light parameter, position parameter, temperature parameter and angle parameter. For example, various kinds of information parameters may be collected, such that the analysis in the next step will be more accurate.

Here, it should be noted that signals transmitted to the display in the present embodiment are digital signals regardless whether the collected information parameter of the environment is current signal or voltage signal, so that the digital signals can be training input of the wavelet neural network model. The training of the wavelet neural network model is common in the art, and thus will not be described in detail herein. Moreover, parameter weights of the wavelet neural network can be obtained by obtaining sample data.

Next, after completing the step S2, at step S3, the collected information parameter is input to the wavelet neural network model built in the step S1 for analysis, and a display status in which the display is to display is obtained.

At this step, determination of whether a user who uses a mobile phone (display) at night fell asleep is explained as a specific example.

When collected light parameter indicates a low brightness, position parameter (for example, GPS coordinates) indicates that the user is at home, the angle parameter is 90 degrees and gravitational acceleration parameter keeps unchanged for the last 2 minutes, these parameters are analyzed by the wavelet neural network model and the obtained user's status is a sleep status. Accordingly, the obtained display status in which the display is to display is standby status corresponding to the sleep status of the user.

Next, at step S4, display status of the display is adjusted based on the above analysis result, such that the display status fulfills user's need. For example, when the display status in which the display is to display is the standby status obtained by the analysis, the display turns to standby.

The adjustment target of the display status may comprise at least one of brightness, standby, resolution and refresh rate.

With the display status adjustment provided by the present embodiment, at least one of gravitational acceleration parameter, light parameter, position parameter, temperature parameter and angle parameter, preferably more than one, is merged together and analyzed by the wavelet neural network, so that display status of the display is adjusted more accurately based on analysis result. Compared with conventional techniques, the method is more intelligent and has high applicability. Meanwhile, a higher fault tolerance can be obtained, and it can be more accurate compared with the conventional threshold value setting method.

Third Embodiment

Figure 5:
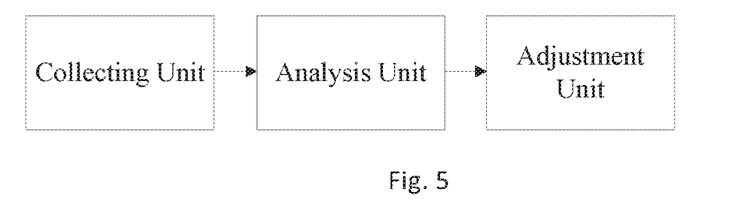
FIG. 5 is a schematic diagram illustrating a display status adjustment device according to a third embodiment of the present invention.

The present embodiment provides a display status adjustment device, and FIG. 5 shows a schematic diagram of the display status adjustment device. As shown in FIG. 5, the display status adjustment device may comprises a collecting unit for collecting information parameter of an environment where a display is located, an analysis unit for inputting the collected information parameter to a pre-built wavelet neural network model for analysis and obtaining a display status in which the display is to display, and an adjustment unit for adjusting display status of the display based on the obtained analysis result.

According to the display status adjustment device of the present embodiment, information parameter of an environment where a display (or user) is located, which is collected by the collecting unit, is analyzed by the analysis unit through the wavelet neural network, so as to obtain information about the environment where the display is located, wherein the information corresponds to a display status of the display, therefore, display status of the display can be adjusted by the adjustment unit according to the information. The adjustment method is very intelligent and has high applicability.

For example, the collecting unit may comprise at least one of a gravity accelerometer, a light sensor, a temperature sensor, a positioning module and an electronic compass. The gravity accelerometer is used for detecting motion information parameter of the display; the light sensor is used for detecting brightness information parameter of light in the environment where the display is located; the temperature sensor is used for detecting temperature information parameter of the environment where the display is located; the positioning module (e.g., GPS) is used for detecting position parameter (indoor/outdoor) of the environment where the display is located; and the electronic compass is used for detecting inclination angle parameter of the display.

For example, adjustment target of the display status may comprise at least one of brightness, standby, resolution and refresh rate.

Figure 6:
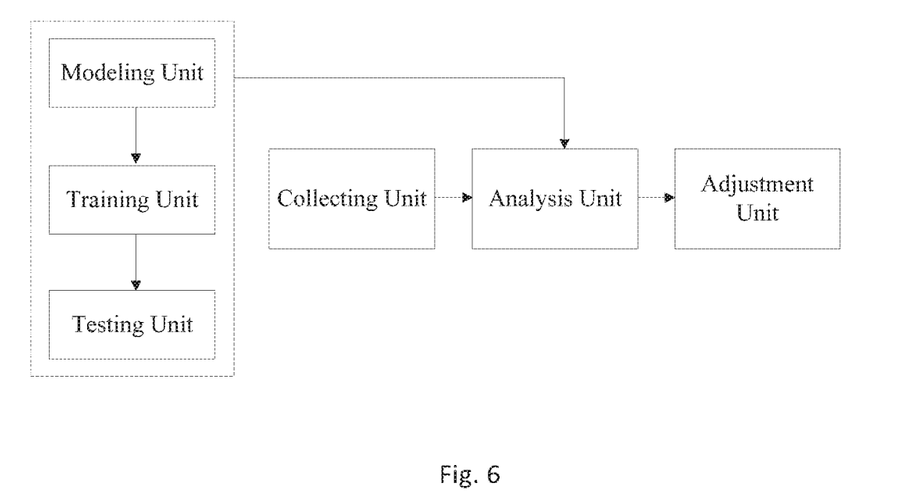
FIG. 6 is another schematic diagram illustrating the display status adjustment device according to the third embodiment of the present invention.

FIG. 6 is another schematic diagram illustrating the display status adjustment device according to the present embodiment. As shown in FIG. 6, the display status adjustment device of the present embodiment may further comprise a modeling unit for building the wavelet neural network model, a training unit for training the built wavelet neural network model, and a testing unit for testing the wavelet neural network model.

Figure 7:
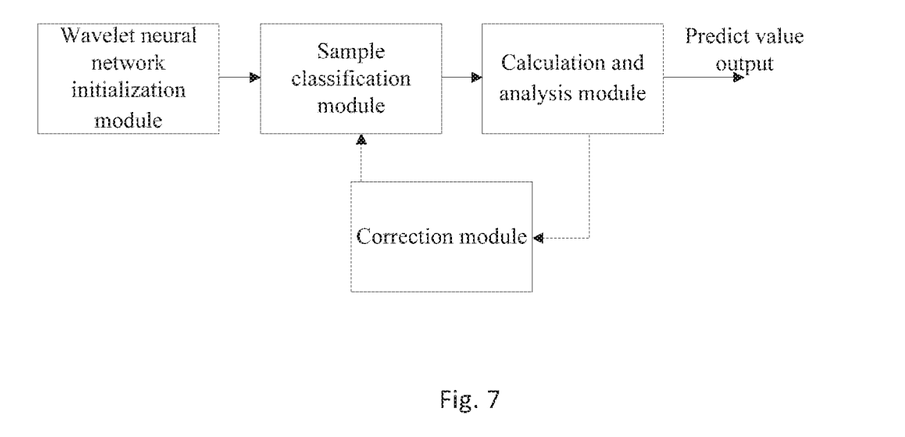
FIG. 7 is a schematic diagram illustrating a training unit of the display status adjustment device according to the third embodiment of the present invention.

FIG. 7 is a schematic diagram illustrating the training unit of the display status adjustment device according to the present embodiment. As shown in FIG. 7, the training unit may comprise an initialization module for randomly initializing a scale factor and a shift factor of wavelet basis function and connection weights of wavelet neural network and setting learning speed of the wavelet neural network model; a sample classification module for classifying samples into a training sample and a testing sample, wherein the training sample is used for training the wavelet neural network model and the testing sample is used for testing the test accuracy of the wavelet neural network model; a calculation and analysis module for inputting the training sample into the wavelet neural network model, calculating a predict output value of the wavelet neural network model, calculating an error between the predict output value and a desired output value of the wavelet neural network model, and analyzing to obtain training times, wherein if the error is less than or equal to 0.0001, or the training times obtained by analysis reaches a predetermined value, the predict output value is output; and a correction module for correcting, if the error is larger than 0.0001 and the training times obtained by analysis does not reach the predetermined value, the scale factor and the shift factor of the wavelet basis function and the connection weights of the wavelet neural network, such that the error between the predict output value and the desired output value of the wavelet neural network model is less than or equal to 0.0001.

In the present embodiment, the wavelet neural network model built by the modeling unit of the display status adjustment device is generated from wavelet basis function.

In order to adjust the display status of the display screen more accurately, the analysis unit in the present embodiment is also used for analyzing collection times of the collecting unit and updating the wavelet neural network model every time when the information parameter of the environment where the display is located is collected 100 times.

Specifically, the wavelet neural network model comprises an input layer, a hidden layer and an output layer. When information parameter input to the input layer is Xi (i=1, 2, 3 . . . k; k is a positive integer), an output of the hidden layer is $h_n(j)$.

$$h_n(j) = h_j\left[\frac{\sum_{i=1}^{k}\omega_{ij} - b_j}{a_j}\right];$$

where i is an i-th node of the input layer, j is a j-th node of the hidden layer; $\omega_{ij}$ is a connection weight between the i-th node of the input layer and the j-th node of the hidden layer; $h_j$ is the wavelet basis function; $b_j$ is a shift factor of the wavelet basis function $h_j$; $a_j$ is a scale factor of the wavelet basis function $h_j$; and n is a positive integer.

A value of the output layer is $y_n(k)$, $$y_n(k) = \sum_{i=1}^{k} \omega_{jk} h_{n-1}(j);$$

where $\omega_{jk}$ is a connection weight between the j-th node of the hidden layer and a k-th node of the output layer.

With the display status adjustment device provided by the present embodiment, the information parameters of an environment where a display is located, which are detected by the gravity accelerometer, the light sensor, the temperature sensor, the positioning module and the electronic compass, are merged together and analyzed by means of the wavelet neural network, so that display status of the display is adjusted based on analysis result. Compared with conventional single function sensors such as a light sensor, higher recognition accuracy and wider applicable range are obtained.

Fourth Embodiment

The present embodiment provides a display, comprising the display status adjustment device according to the third embodiment.

The display in the present embodiment is preferably a display of a mobile device (e.g., a mobile phone), but may be other displays as well. The display further comprises other know components.

It could be understood that the above embodiments are merely exemplary embodiments adopted for describing the principle of the present invention, but the present invention is not limited thereto. Various variations and improvements may be made for those with ordinary skill in the art without departing from the spirit and essence of the present invention, and these variations and improvements shall also fall within the protection scope of the present invention.

What is claimed is:

1. A display status adjustment method, comprising steps of:
   collecting an information parameter of an environment where a display is located;
   inputting the collected information parameter to a prebuilt wavelet neural network model for analysis, and obtaining a display status in which the display is to display; and
   adjusting a current display status of the display based on a result of the analysis,
   wherein the information parameter comprises a gravitational acceleration parameter, a light parameter, a position parameter, a temperature parameter and an angle parameter,
   wherein an adjustment target of the display status comprises at least one of standby, resolution and refresh rate, and
   wherein the gravitational acceleration parameter, the light parameter, the position parameter, the temperature parameter and the angle parameter are merged together and analyzed with the pre-built wavelet neural network model, so that the current display status of the display is adjusted based on the result of the analysis.

2. The display status adjustment method according to claim 1, wherein the adjustment target of the display status further comprises brightness.

3. The display status adjustment method according to claim 1, wherein the wavelet neural network model is updated every time when the information parameter of the environment where the display is located is collected 100 times.

4. The display status adjustment method according to claim 1, wherein the wavelet neural network model is generated from a wavelet basis function.

5. The display status adjustment method according to claim 4, wherein the wavelet neural network model comprises an input layer, a hidden layer and an output layer, wherein
   the information parameter input to the input layer is $X_i$, where i=1, 2, 3 . . . k, k is a positive integer; and
   an output of the hidden layer is $h_n(j)$, $$h_n(j) = h_j\left[\frac{\sum_{i=1}^{k}\omega_{ij}X_i - b_j}{a_j}\right],$$

where i is an i-th node of the input layer, j is a j-th node of the hidden layer; $\omega_{ij}$ is a connection weight between the i-th node of the input layer and the j-th node of the hidden layer; $h_j$ is the wavelet basis function; $b_j$ is a shift factor of the wavelet basis function $h_j$; $a_j$ is a scale factor of the wavelet basis function $h_j$; and n is a positive integer.

6. The display status adjustment method according to claim 5, wherein a value of the output layer is $y_n(k)$, $$y_n(k) = \sum_{i=1}^{k}\omega_{jk}h_{n-1}(j),$$

where $\omega_{jk}$ is a connection weight between the j-th l=1 node of the hidden layer and a k-th node of the output layer.

7. The display status adjustment method according to claim 1, wherein before collecting the information parameter of the environment where the display is located, the method further comprises steps of:
building the wavelet neural network model;
training the built wavelet neural network model; and
testing the wavelet neural network model.

8. The display status adjustment method according to claim 7, wherein the wavelet neural network model is generated from a wavelet basis function, and wherein the step of training the built wavelet neural network model comprises:
a step of initializing the wavelet neural network model, wherein a scale factor and a shift factor of the wavelet basis function and connection weights of the wavelet neural network are initialized randomly, and a learning speed of the wavelet neural network model is set;
a step of classifying samples for classifying samples into a training sample and a testing sample, wherein the training sample is used for training the wavelet neural network model and the testing sample is used for testing a test accuracy of the wavelet neural network model;
a step of calculating and analyzing for inputting the training sample into the wavelet neural network model, calculating a predict output value of the wavelet neural network model, calculating an error between the predict output value and a desired output value of the wavelet neural network model, and analyzing to obtain training times, wherein if the error is less than or equal to 0.0001, or the training times obtained by the analysis reaches a predetermined value, a step of outputting the predict output value is performed, otherwise, a step of correction is performed, the step of correction is used for correcting the scale factor and the shift factor of the wavelet basis function and the connection weights of the wavelet neural network, such that the error between the predict output value and the desired output value of the wavelet neural network model is less than or equal to 0.0001; and
the step of outputting the predict output value for outputting the predict output value.

9. A display status adjustment device, comprising:
a collecting unit for collecting an information parameter of an environment where a display is located;
an analysis unit for inputting the collected information parameter to a pre-built wavelet neural network model for analysis and obtaining a display status in which the display is to display; and
an adjustment unit for adjusting a current display status of the display based on a result of the analysis,
wherein the information parameter comprises a gravitational acceleration parameter, a light parameter, a position parameter, a temperature parameter and an angle parameter,
wherein an adjustment target of the display status comprises at least one of standby, resolution and refresh rate, and
wherein the gravitational acceleration parameter, the light parameter, the position parameter, the temperature parameter and the angle parameter are merged together and analyzed with the pre-built wavelet neural network model, so that the current display status of the display is adjusted based on the result of the analysis.

10. The display status adjustment device according to claim 9, wherein the adjustment target of the display status further comprises brightness.

11. The display status adjustment device according to claim 9, further comprising:
a modeling unit for building the wavelet neural network model;
a training unit for training the built wavelet neural network model; and
a testing unit for testing the wavelet neural network model.

12. The display status adjustment device according to claim 11, wherein the training unit comprises:
an initialization module for randomly initializing a scale factor and a shift factor of a wavelet basis function and connection weights of the wavelet neural network and setting a learning speed of the wavelet neural network model;
a sample classification module for classifying samples into a training sample and a testing sample, wherein the training sample is used for training the wavelet neural network model and the testing sample is used for testing a test accuracy of the wavelet neural network model;
a calculation and analysis module for inputting the training sample into the wavelet neural network model, calculating a predict output value of the wavelet neural network model, calculating an error between the predict output value and a desired output value of the wavelet neural network model, and analyzing to obtain training times, wherein if the error is less than or equal to 0.0001, or the training times obtained by the analysis reaches a predetermined value, the predict output value is output; and
a correction module for correcting, if the error is larger than 0.0001 and the training times obtained by the analysis does not reach the predetermined value, the scale factor and the shift factor of the wavelet basis function and the connection weights of the wavelet neural network, such that the error between the predict output value and the desired output value of the wavelet neural network model is less than or equal to 0.0001.

13. The display status adjustment device according to claim 9, wherein the analysis unit is also used for analyzing collection times of the collecting unit and updating the wavelet neural network model every time when the information parameter of the environment where the display is located is collected 100 times.

14. The display status adjustment device according to claim 9, wherein the wavelet neural network model is generated from a wavelet basis function.

15. The display status adjustment device according to claim 14, wherein the wavelet neural network model comprises an input layer, a hidden layer and an output layer, wherein the information parameter input to the input layer is $X_i$, where i=1, 2, 3 . . . k, k is a positive integer; and an output of the hidden layer is $h_n(j)$, $$h_n(j) = h_j\left[\frac{\sum_{i=1}^{k} \omega_{ij}X_i - b_j}{a_j}\right],$$

where i is an i-th node of the input layer, j is a j-th node of the hidden layer; $\omega_{ij}$ is a connection weight between the i-th node of the input layer and the j-th node of the hidden layer; $h_j$ is the wavelet basis function; $b_j$ is a shift factor of the wavelet basis function $h_j$; $a_j$ is a scale factor of the wavelet basis function $h_j$; and n is a positive integer.

16. The display status adjustment device according to claim 15, wherein a value of the output layer is $y_n(k)$, $$y_n(k) = \sum_{i=1}^{k} \omega_{jk} h_{n-1}(j),$$

where $\omega_{jk}$ is a connection weight between the j-th node of the hidden layer and a k-th node of the output layer.

17. A display, comprising the display status adjustment device according to claim 9.

18. The display according to claim 17, wherein the display status adjustment device further comprises:

a modeling unit for building the wavelet neural network model;

a training unit for training the built wavelet neural network model; and a testing unit for testing the wavelet neural network model.

* * * * *